July 24, 1962 O. TSCHUMI ET AL 3,046,353

TELEPHONE SUB-STATION INCLUDING MICROPHONE AMPLIFIER

Filed Nov. 7, 1957 3 Sheets-Sheet 1

INVENTORS
OTTO TSCHUMI
HANS KAPPELER
RUDOLF STREIT

TELEPHONE SUB-STATION INCLUDING MICROPHONE AMPLIFIER

INVENTORS:
OTTO TSCHUMI
HANS KAPPELER
RUDOLF STREIT
By [signature],
Att'y

TELEPHONE SUB-STATION INCLUDING MICROPHONE AMPLIFIER

Filed Nov. 7, 1957 3 Sheets-Sheet 3

INVENTORS
OTTO TSCHUMI
HANS KAPPELER
RUDOLF STREIT

United States Patent Office 3,046,353

Patented July 24, 1962

3,046,353

TELEPHONE SUB-STATION INCLUDING MICROPHONE AMPLIFIER

Otto Tschumi, Hans Kappeler, and Rudolf Streit, all of Solothurn, Switzerland, assignors to Autophon Aktiengesellschaft, Solothurn, Switzerland Filed Nov. 7, 1957, Ser. No. 695,148
Claims priority, application Switzerland Nov. 10, 1956
1 Claim. (Cl. 179—81)

This invention relates to telephony, and more particularly to telephone sub-stations incorporating microphone amplifiers.

In the period elapsed since transistors were first introduced in the telephone field, a number of telephone sub-stations have been proposed which incorporate a microphone amplifier supplied via the subscriber's line. This arrangement is advantageous in that it permits of the use of a microphone of high quality which delivers only a low voltage.

It is a primary object of this invention to provide a sub-station wherein a microphone amplifier is utilized to a greater extent than heretofore proposed.

Other objects, and the manner in which the same are attained will become apparent as the present specification proceeds.

The invention generally involves a telephone sub-station incorporating a microphone amplifier containing transistors which is supplied via the subscriber's line. More particularly, this sub-station comprises circuit components which permit of the operation of at least a part of the microphone amplifier when the cradle switch contacts are in their normal or rest positions.

In the drawings accompanying this specification and forming part thereof, four embodiments of the invention are illustrated diagrammatically by way of example.

In the drawings,

FIG. 1 shows a circuit diagram of the first embodiment of the invention involving a station which includes an electro-acoustic transducer serving for call signalling purposes. In this station, a criterion emitted by the exchange causes the generation of a call signal which is fed to the electro-acoustic transducer.

FIG. 2 shows a circuit diagram of the second embodiment of the invention involving a station which also contains an electro-acoustic transducer for call signalling purposes, and wherein the call signal received via the line in the form of an audio frequency alternating voltage, is amplified and fed to the electro-acoustic transducer. Besides, FIG. 2, the same as FIG. 1, incorporates an arrangement for emitting selection criteria in the form of audio frequencies which arrangement operates with the assistance of the microphone amplifier.

Figure 1:
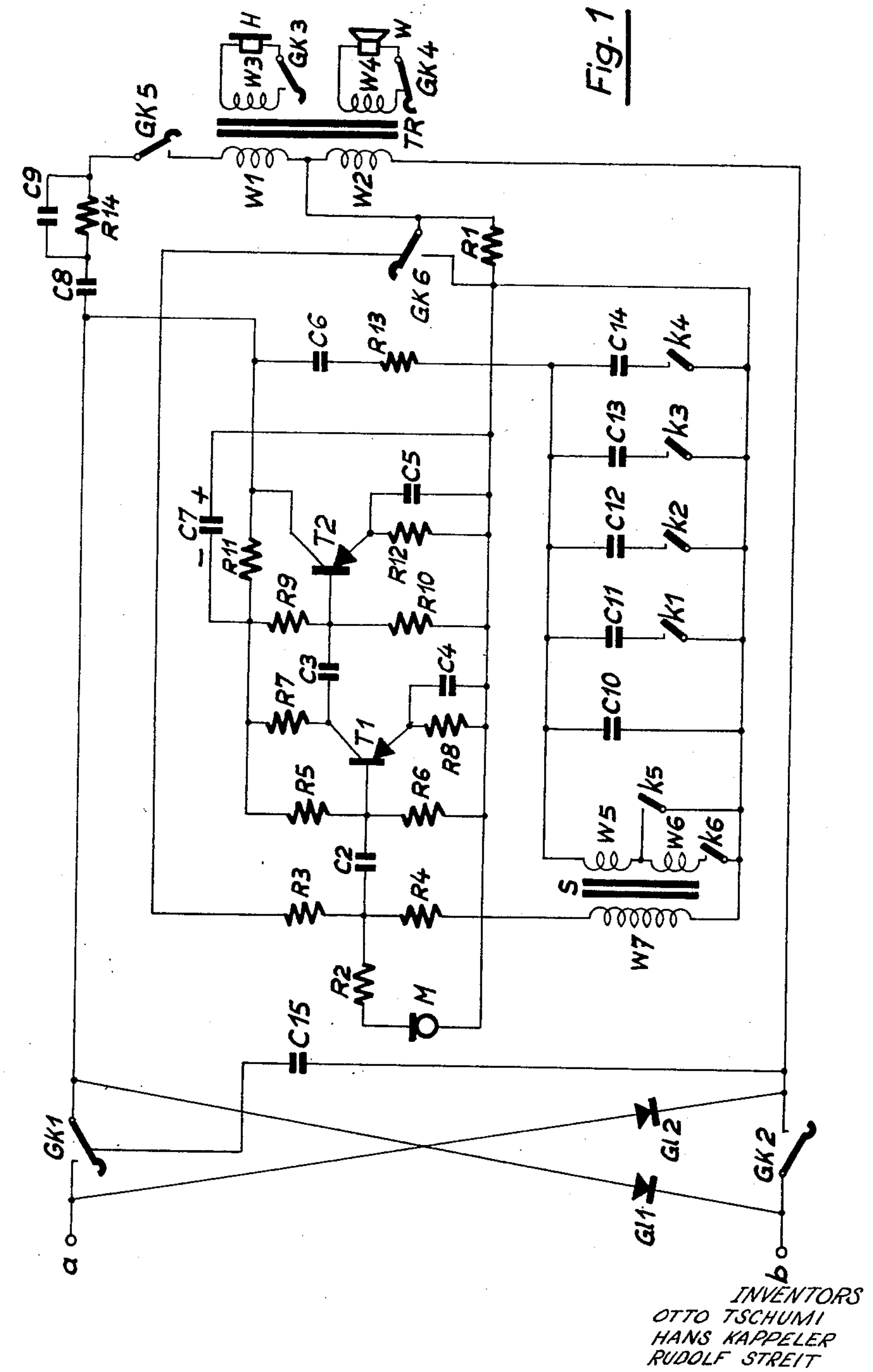

Throughout FIGS. 1–4, the microphone amplifier is shown to include transistors of the p-n-p type. Accordingly, the polarity of the circuits described and shown in the drawings, refers to transistors of this type. The same circuits, of course, could be used in conjunction with transistors of the n-p-n type provided all polarites were reversed.

Referring now to the drawings, wherein like elements are denoted by identical reference numerals, and first to FIG. 1, it is observed that the circuit diagram of this first embodiment of the invention corresponds basically to the known station including a differential transformer. This station according to FIG. 1, however, comprises in place of the traditional carbon microphone, a magnetic microphone M and for use in conjunction therewith, a microphone amplifier including transistors T1 and T2. The output of this microphone amplifier is located at the same point where the carbon microphone is located in conventional stations. The differential transformer TR including the four windings W1–W4 effects—provided the cradle switch contacts GK are in their working positions—in conjunction with the balanced network consisting of the resistor R14 and the condensers C8 and C9, in a well known manner, a sidetone damping between the amplifier output and the receiver H. Inasmuch as this circuit component has no direct connection with the invention, it will not be described in great detail. The microphone amplifier is switched on by the closing of the cradle switch contacts, whereupon it requires a negative polarity on the *a*-wire, and a positive polarity on the *b*-wire. Compared with an ordinary amplifier, it displays the special feature that it is supplied via the same terminals through which the output is passed. In order to make sure that the supply is free of the output signal, a filter section consisting of the resistor R11 and the condenser C7 is provided which uncouples output and supply. Across the condenser C7, therefore, exists a constant direct voltage of the polarity indicated in the drawing. Due to the effect of the condenser C8, the total directed current of the line passes as supply, to the microphone amplifier.

The microphone amplifier operates as follows: the signal passes from the microphone M through the resistor R2 and the condenser C2, to the base of the transistor T1, the condenser C2 serving for blocking the microphone with respect to the direct voltage. The base of the transistor T1 receives a negative bias with respect to the emitter by means of the voltage divider consisting of the resistors R5 and R6. The collector current passing through the resistor R7 is modified by the current deriving from the microphone which is effective between the base and the emitter. The voltage generated on the resistor R7 is passed through the condenser C3, to the base of the second transistor T2. The resistor R8 bridged by the condenser C4 serves for stabilizing the collector current in that it has a negative feed-back effect as far as direct current is concerned. Such a stabilization is a necessity because of the very outspoken dependence on temperature, of the transistors. The second amplifier stage including the transistor T2 is designed analogous to the first stage.

The system by which the station emits audio frequency selection criteria, is switched on by means of 10 keys which actuate the contacts denoted with *k* in a manner requiring no detailed description. The sounds are generated by the frequency determining elements shown in the lower portion of FIG. 1, in conjunction with the microphone amplifier. These elements consist of the coil S including three windings W5–W7 and the capacitances C10–C14. The closing of the contact *k*5 provides an oscillating circuit consisting of the condenser C10 and the winding W5, whereas the closing of the contact *k*6 provides such a circuit including the two windings W5 and W6. If in addition to *k*5 or *k*6, one of the contacts *k*1–*k*4 is actuated, one of the capacitances C11–C14 is connected in parallel to the capacitance C10, so that a total of 10 oscillating circuits each having a different frequency, can be formed. The oscillating circuits are coupled, on the one hand, through the winding W7 and the resistor R4, to the input of the microphone amplifier and on the other hand, through the condenser C6 and the resistor R13, to the output of this amplifier. The conditions are so chosen that as soon as an oscillating circuit is formed by the closing of one of the contacts *k*5 or *k*6, a feed-back of such magnitude occurs that the microphone amplifier oscillates and thus operates as voice frequency generator at the frequency determined by the respective oscillating circuit involved. The contacts *k*, in this connection, are so controlled by the keys that on depression of each key, always one of the contacts *k*5 or *k*6, and possibly an additional one of the contacts *k*1–*k*4 is closed. Thus it is possible to emit selection criteria in the form of 10 different sounds. Owing to the assistance of the microphone amplifier in the generation of the selection criteria, the expenditure required therefor is quite small.

The station is called by means of the electro-acoustic transducer W. This transducer is caused to emit sound by the microphone amplifier connected as an audio frequency generator, the microphone amplifier being switched on by the exchange by a reversal of the polarity of the subscriber's line, plus being placed on the *a*-wire and minus on the *b*-wire of this line. This switching on takes place by means of the rectifiers G*l*1 and G*l*2. Through the rectifier G*l*2 the *a*-wire is connected with that pole of the cradle switch contact correlated to the *b*-wire, which is connected with that part of the circuit which contains the microphone amplifier. Similar conditions prevail with respect to the *b*-wire and the rectifier G*l*1. In view of this arrangement, when the polarity is reversed, the open cradle switch contacts are bridged by the rectifiers, and at the same time the supply is fed to the microphone amplifier with the correct polarity. The utilization of the microphone amplifier as an audio frequency generator is made possible by the cradle switch contact GK6. On the one hand, this contact, in its position of rest, connects the resistor R1 in series with the output of the microphone amplifier, and on the other hand, there is formed across the rest side of the cradle switch contact GK6 and the resistor R3, a regenerative circuit which passes the voltage generated across the resistor R1 to the series connection of the resistors R3 and R4. At the input of the microphone amplifier there now appears the partial voltage existing across the resistor R4. Inasmuch as the voltage across the resistor R1 corresponds to the current at the output of the amplifier, the amplifier starts oscillating. On its output, there is connected only the electro acoustic transducer W which is coupled through the windings W2 and W4 of the transformer TR. The two windings W1 and W3 are cut off by means of the cradle switch contacts GK3 and GK5. As the regenerative voltage depends on the current in the transducer, the amplifier oscillates at the current resonance frequency of the transducer, which yields the maximum volume. The condenser C15 which through the cradle switch contact GK1, in the position of rest of the station, is connected in parallel to the line, prevents audio energy from escaping, via the line, to the exchange.

Figure 2:
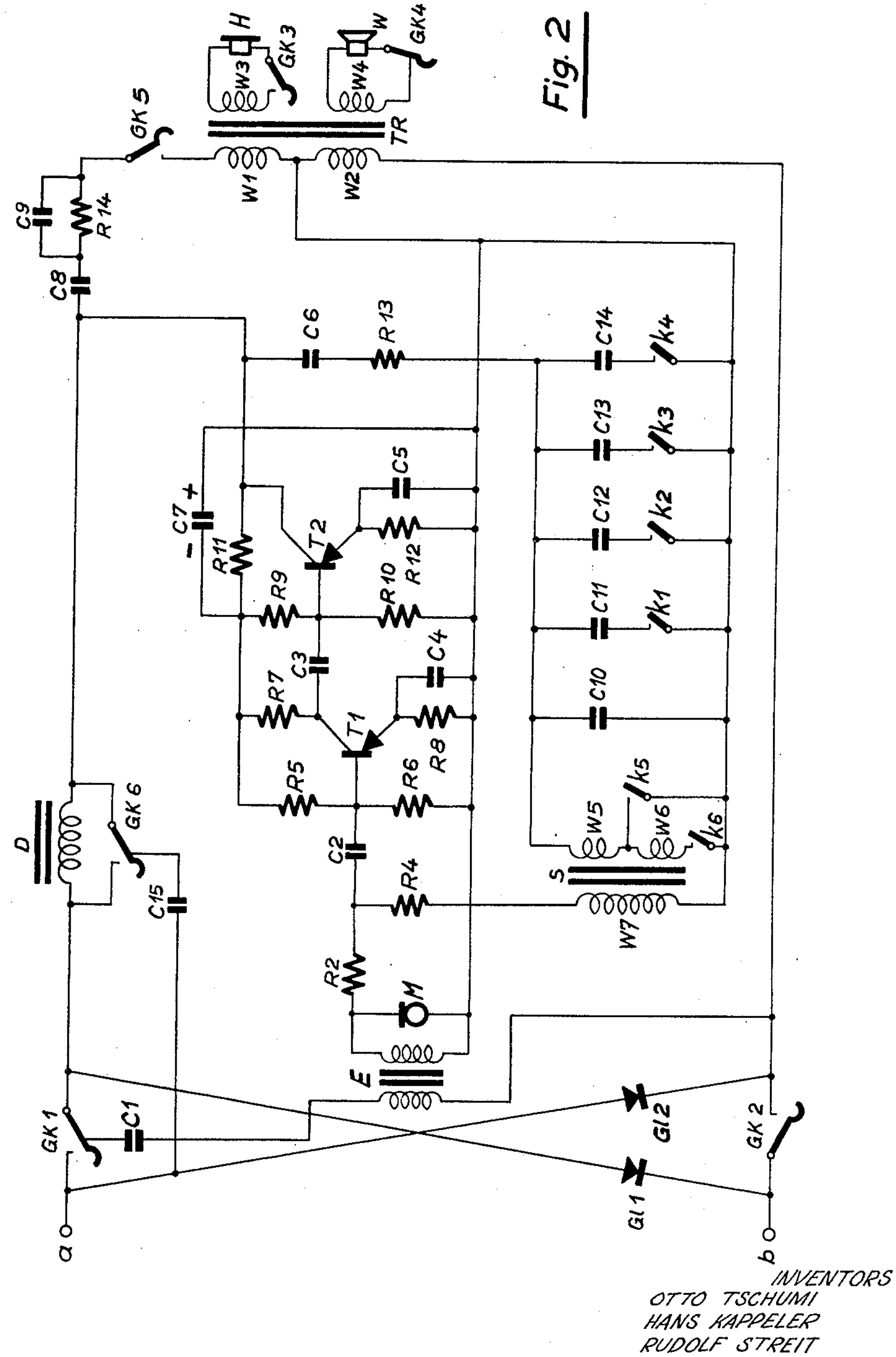

The second embodiment of the invention illustrated in FIG. 2 involves a station which also contains an electro-acoustic transducer serving for call signalling purposes. This embodiment, however, is distinguished from that of FIG. 1 in that the transducer serving for call signalling purposes is not supplied by an audio frequency generator situated in the station, but that the signal to be supplied to the transducer is put on the line by the exchange at a low level and is amplified in the station. Here also the amplifier, when the station is in its rest position, is set operating by the exchange by means of a reversal of the polarity of the subscriber's line. The calling signal also originating in the exchange is passed via the rest side of the cradle switch contact GK1, the condenser C1 and transformer E to the input of the microphone amplifier. The signal is amplified in the same manner in which microphone signals are amplified in the course of a conversation, and is passed through the windings W2 and W4 to the electro-acoustic transducer W. The windings W1 and W3 are again cut off by means of the cradle switch contacts GK5 or GK3, respectively. The condenser C15 connected via the contact GK6 in the position of rest of the station, creates as far as alternating current is concerned, a short circuit for the amplified signal. In conjunction with the choke D, it prevents the amplified energy from returning to the subscriber's line, a return which would result in so strong a positive or negative feed-back of the amplifier that a proper functioning would be seriously jeopardized.

Whereas in the first embodiment of the invention, the exchange in order to call the subscriber, merely reverses the polarity of the subscriber's line, the second embodiment requires, apart from this reversal of the polarity, the emission of a signal of the frequency to be emitted by the transducer. This offers the advantage over the first embodiment that by a suitable selection of one of different frequencies, a variety of signals can be emitted.

The first two embodiments of the invention have in common the feature that in the position of rest of the cradle switch contacts, the output of the microphone amplifier is connected, for alternating current purposes, with the electro-acoustic transducer serving for signalling purposes. In the second embodiment, in addition, when the cradle switch contacts are in their rest position, the input of the microphone amplifier is connected for alternating current purposes, with the subscriber's line.

Figure 3:
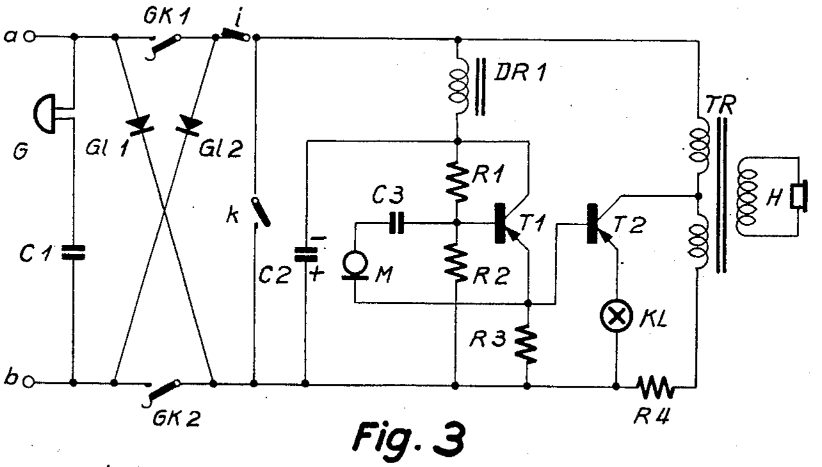
FIG. 3 shows a circuit diagram of the third embodiment of the invention involving a station designed to permit the acoustic surveillance of the room in which the station is located, from a listening post.

The third embodiment of the invention, the circuit diagram of which is shown in FIG. 3, involves a station for a telephone installation which is combined with a listening-in, monitoring or similar acoustic control system. In contrast to the stations of the first two embodiments of the invention, this station is not equipped with an audio selection system, but rather with a conventional number dial. The microphone amplifier differs somewhat from those employed in the first two embodiments, and is somewhat simplified compared with the amplifiers described above.

A system with a listening, monitoring or similar acoustic control center wherein this station is to be employed may be utilized, for example, in hospitals to keep an acoustic check on gravely ill, or unconscious patients, eliminating the necessity to enter their rooms. The added expenditure compared with a normal telephone system can be kept within reasonable limits. The station in its rest position, is switched on for acoustic control purposes by the monitoring center, by means of a reversal of the polarity of the supply line accompanied by a cut-off of the exchange. The circuit diagram of the monitoring center has no direct connection with the present invention and for this reason, is not shown in the drawings.

The station contains well known elements: the differential transformer TR with the receiver H and the balancing network R4, the bell G with the condenser C1, the cradle switch contacts GK1 and GK2, and further a number dial with the contacts *i* and *k*. The microphone amplifier consists of two transistor stages. The first stage, which is provided in the form of a collector circuit, is supplied through a filter chain consisting of the choke DR1 and the condenser C2. The two resistors R1 and R2 generate a bias for the base of the transistor T1. The signal of the magnetic microphone M is applied, through the condenser C3, between the base and the emitter of the transistor T1. The current amplified due to the action of the transistor and passed through the collector and emitter, generates, in the resistor R3, a voltage the direct voltage component of which biases the base of the transistor T2 while its alternating voltage component forms the input signal of the second stage. This second stage with the transistor T2 is operated as an emitter circuit. The glow-lamp KL in the emitter circuit generates a negative feed-back depending on current, and thereby compensates for variations of the supply current intensity which depends on the length of the subscriber's line and variations of the temperature and the transistor characteristics. The amplifier is set operating when the cradle switch contacts are in their rest position, in the same manner as in the first two embodiments of the invention referred to above. Inasmuch as in contrast to the first two embodiments, in the embodiment according to FIG. 3 no cradle switch contacts are disposed in the circuits of the microphone amplifier, this amplifier amplifies—when it is switched on—even when the cradle switch contacts are in their rest position, the microphone signals and transmits the same through the line to the monitoring or acoustic control center.

Figure 4:
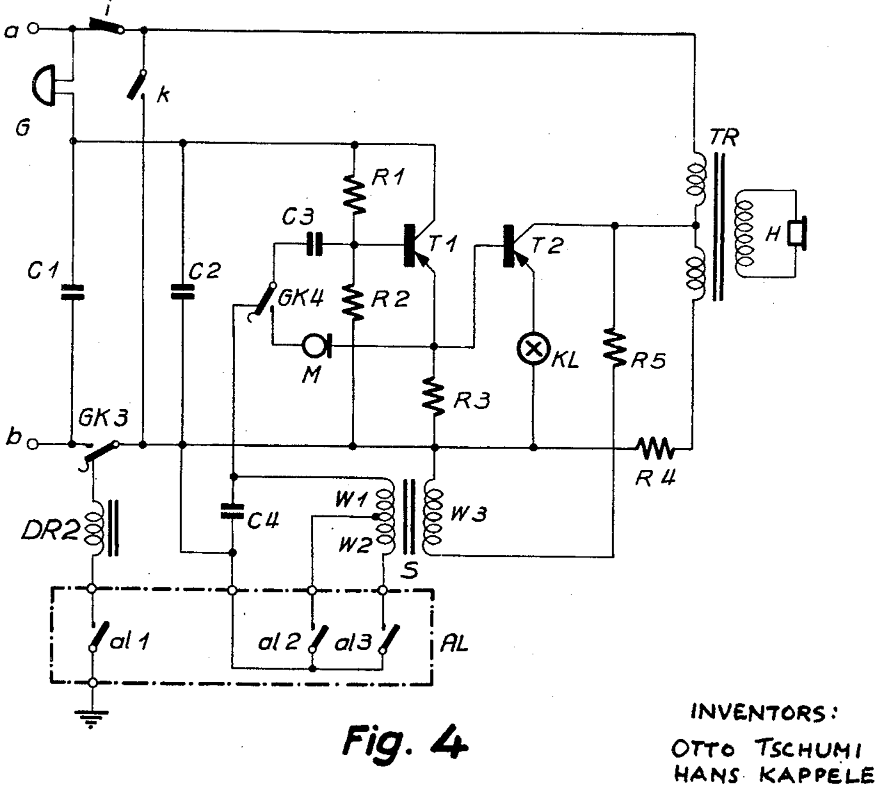
FIG. 4 shows the circuit diagram of the fourth embodiment of the invention involving a station wherein the microphone amplifier generates, in dependence on switching operations taking place outside the station, signal frequencies which are then delivered via the line.

The fourth embodiment of the invention the circuit diagram of which is shown in FIG. 4, concerns a station for a telephone system wherein the subscribers' lines are utilized for transmitting alarm signals. In contrast to the preceding embodiments of the invention according to FIGS. 1–3, the microphone amplifier is not switched on when the cradle switch contacts are in their rest position, from the exchange or center via the line, but here it is switched on by components disposed in proximity to the station. The microphone amplifier is similar to that described above with reference to the third embodiment of the invention, with the difference, however, that for the purpose of filtering the supply current of the first stage no separate choke is used but instead, this function is taken over by the bell G. Let it be supposed that the alarm system AL which is correlated with the station, is designed to distinguish between two different causes for alarm with different alarm signals to be transmitted correspondingly. For this purpose, the alarm system comprises three contacts *al*1–*al*3, of which the contacts *al*1 and *al*2 are actuated in the case of one cause for alarm, while the contacts *al*1 and *al*3 are actuated in the case of the second cause. If one of the contacts *al*2 or *al*3 is closed, an oscillating circiut consisting of the condenser C4 and the translator S is formed. The resonance frequency of this circuit depends on which of the contacts is actuated, inasmuch as actuation of the contact *al*2 connects the winding W1, actuation of the contact *al*3, however, both the series-connected windings W1 and W2 of the translator S, in parallel to the condenser C4. Through the rest side of the cradle switch contact GK4, when the station is in its position of rest, this oscillating circuit is placed on the input of the first amplifier stage. By the arrangement of a winding W3 which through the resistor R5 is connected with the output of the amplifier, a feed-back is generated. The conditions in this connection are so selected that the amplifier in this state can oscillate at the frequency determined by the resonance frequency of the oscillating circuit. The supply of the voice frequency generator thus formed is switched on by means of the contact *al*1, which through the rest side of the cradle switch contact GK3 and the choke DR2, grounds the amplifier. The current passes from this ground through the station to the *a*-wire on which the exchange places a voltage negative relative to ground. In this connection it is assumed that the exchange is not engaged by the current which passes in the *a*-wire exclusively. The bridging of the cradle switch contact GK3 by the condensers C1 and C2 permits the signal to be transmitted on the line. The frequency of this signal depends on which of the contacts *al*2 or *al*3 has been closed in addition to the contact *al*1.

The evaluation of the signal can now take place in the exchange or at any other place to which it is transmitted, to there release the corresponding alarm. The frequency generated may be in the audio range or above. In the latter case, the signals can be passed in the exchange, by means of dividing networks, onto another line.

Evidently, the invention is not limited to the four embodiments noted above for illustration purposes only. In contrast to the embodiments of the invention described above in detail, it is equally possible to uitilize the microphone amplifier even when the loop of the subscriber's line is closed, and thus the exchange is engaged, for amplifying or generating alarm signals. Such a utilization can be made, for example, in alarm systems of a type known per se, which automatically engage the subscriber's line, select a number and then emit a certain signal, the invention serving to materially reduce the cost of such a system. In all these applications, the invention results in reducing the cost when compared with stations wherein the functions described above, which are not connected with the amplification of the microphone signal, require separate amplifiers or audio frequency generators.

We wish it to be understood that we do not desire to be limited to the details of construction, circuit arrangement or operation shown and described herein as quite a number of modifications within the scope of the following claims are likely to occur to workers in this field which would not depart from the spirit of this invention nor involve any sacrifice of the advantages thereof.

We claim:

A telephone subscriber's station connected to a D.C. source with a first and second wire of a subscriber's line, containing a microphone amplifier with transistors, supplied via a first and a second connecting terminal over the subscriber's line, said station comprising two cradle switch contacts to connect said first connecting terminal to said first wire and said second connecting terminal to said second wire and comprising at least two rectifiers, said first connecting terminal being connected with said second wire via one of said rectifiers and said second connecting terminal being connected with said first wire via the other one of said rectifiers, whereby to switch on the microphone amplifier when the said cradle switch contacts are in the rest position, by reversing the polarity of said D.C. source.

References Cited in the file of this patent

UNITED STATES PATENTS

| | | |
|---|---|---|
| 2,130,468 | Martin | Sept. 20, 1938 |
| 2,332,551 | Bascom | Oct. 26, 1943 |
| 2,824,173 | Meacham | Feb. 18, 1958 |
| 2,831,067 | Bryant | Apr. 15, 1958 |
| 2,916,558 | Leman | Dec. 8, 1959 |